(12) United States Patent
Cali

(10) Patent No.: US 6,298,773 B1
(45) Date of Patent: Oct. 9, 2001

(54) COVER FOR CONTROLLING STEAM FROM BOILING KETTLE

(76) Inventor: Frank C. Cali, 6797 No. Ionia Ave., Chicago, IL (US) 60646

( * ) Notice: Subject to any disclaimer, the term of this patent is extended or adjusted under 35 U.S.C. 154(b) by 0 days.

(21) Appl. No.: 09/728,903

(22) Filed: Dec. 4, 2000

(51) Int. Cl.[7] .................. A23L 1/00; A47J 27/00; A47J 27/06; A47J 27/58; A47J 37/00

(52) U.S. Cl. ................... 99/337; 99/403; 126/369; 126/389.1; 220/316; 220/912

(58) Field of Search ................. 99/330, 337, 338, 99/403–407, 342, 339, 340; 126/369, 373.1, 384.1, 389.1; 219/401; 220/303, 304, 314–316, 318, 298, 324, 378, 287, 592, 756, 369, 912, 367.1; 426/510, 511, 523; D7/391

(56) References Cited

U.S. PATENT DOCUMENTS

| | | | |
|---|---|---|---|
| 2,760,672 | * | 8/1956 | Cronheim ............. 126/389.1 X |
| 3,598,105 | * | 8/1971 | Cristaldi ............... 220/912 X |
| 3,937,359 | * | 2/1976 | Stockton, Jr. ............ 220/369 |
| 4,005,645 | * | 2/1977 | Janssen ................. 99/403 |
| 4,298,789 | * | 11/1981 | Eichelberger et al. ...... 219/401 X |
| 4,733,795 | * | 3/1988 | Boehm ................ 220/316 X |
| 4,932,527 | * | 6/1990 | Hayes ................... 99/331 |
| 5,348,187 | * | 9/1994 | Schultz .............. 126/373.1 X |
| 5,355,777 | * | 10/1994 | Chen et al. ............ 99/410 X |
| 5,400,700 | * | 3/1995 | Bois ..................... 99/403 |
| 5,520,103 | * | 5/1996 | Zielinski et al. ........ 126/369 X |
| 5,673,611 | * | 10/1997 | Tieman ................ 99/415 X |

* cited by examiner

Primary Examiner—Timothy F. Simone
(74) Attorney, Agent, or Firm—Paul H. Gallagher

(57) ABSTRACT

A compound cover made up of a pair of cover parts of a diameter substantially the same as the kettle. The cover parts rest on the kettle in stacked arrangement, and are rotatable relative to each other. The parts have hole, therethrough in a common pattern, and can be rotated to put the holes in complete register, and out of register where all the holes are completely blocked. The cover parts are of inverted conical shape to facilitate drainage of condensed water back into the kettle. In a modified form, the parts have stepped formation at the periphery for fitting any of a series of different sized kettles within a wide range.

12 Claims, 2 Drawing Sheets

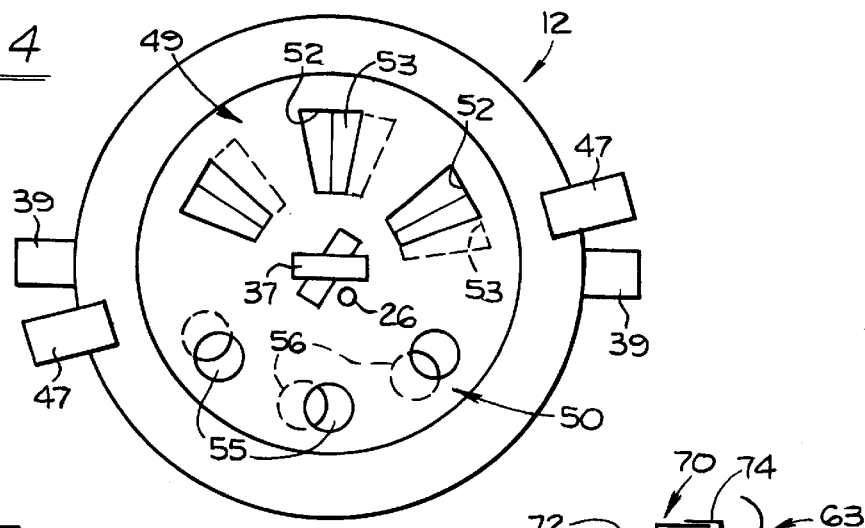
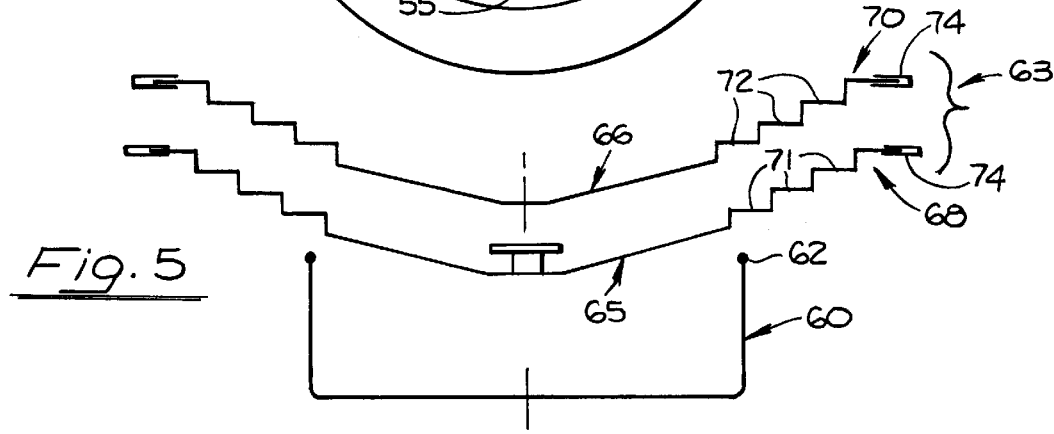
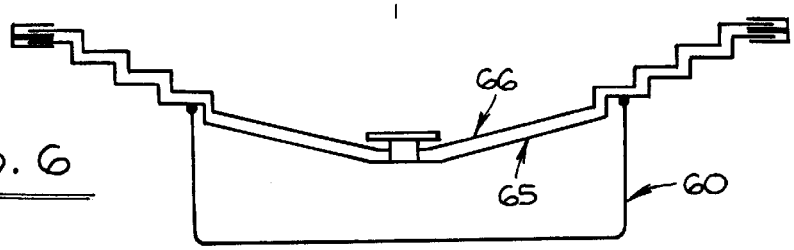
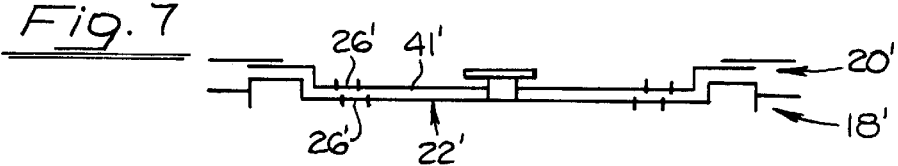
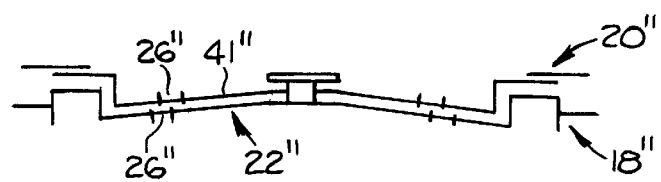
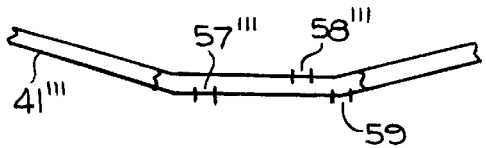

COVER FOR CONTROLLING STEAM FROM BOILING KETTLE

FIELD OF THE INVENTION

The device of the invention resides in the field of cooking, as on a stove, and involves boiling kettles or pots.

SUMMARY OF THE INVENTION

The device of the invention is a cover for a kettle, or pot, and includes two parts that are fitted together and are manually controllable or adjustable, for controlling the steam in the kettle in a cooking operation.

In cooking in a kettle, it is often desired to confine the heat in the kettle, particularly by confining the steam, for increasing the general level of temperature and accordingly reduces the time for cooking. Many times it is desired not to totally confine the steam in the kettle, but to confine it only to a limited extent.

A main object of the present invention is to provide a cover for controlling steam in a boiling kettle to an intermediate extent, in which the steam is partially confined, but not entirely, particularly as the heat in the kettle increases.

Another object is to provide a compound cover for producing the results referred to above, that is made up of a pair of counterparts, that are relatively adjustable for producing the desired result in controlling the degree of pressure, and rate of escape of steam.

Another object is to provide a device of the character referred to, of modified form, having a new feature that it is designed for fitting any of a number of different sizes of kettles, within a considerable range.

An additional object is to provide a device of the Foregoing character wherein the adjusting of the counterparts of the cover can be accomplished in a very simple matter.

BRIEF DESCRIPTIONS OF THE INDIVIDUAL FIGURES OF THE DRAWINGS

FIG. 4 is a view similar to FIG. 3 but with the counterparts of the cover relatively adjusted to a position different from that of FIG. 3.

FIG. 5 is a view similar to FIG. 1 of a modified form or compound cover.

FIG. 6 is a diagrammatic view similar to FIG. 5, but with the counterparts of the cover fitted together and fitted on the kettle, as in FIG. 2.

FIG. 7 is a view similar to the upper part of FIG. 2, showing another modified form.

FIG. 8 is a view similar to the upper part of FIG. 2, showing still another modified form.

FIG. 9 is a fragmentary sectional view of the cover parts showing return holes.

DETAILED DESCRIPTION OF THE DRAWINGS

A standard kettle is shown at 10 and the cover of the present invention shown at 12. The kettle 10 has a surrounding wall 13 with an open top 14 which may have a surrounding bead 17.

Figure 1:
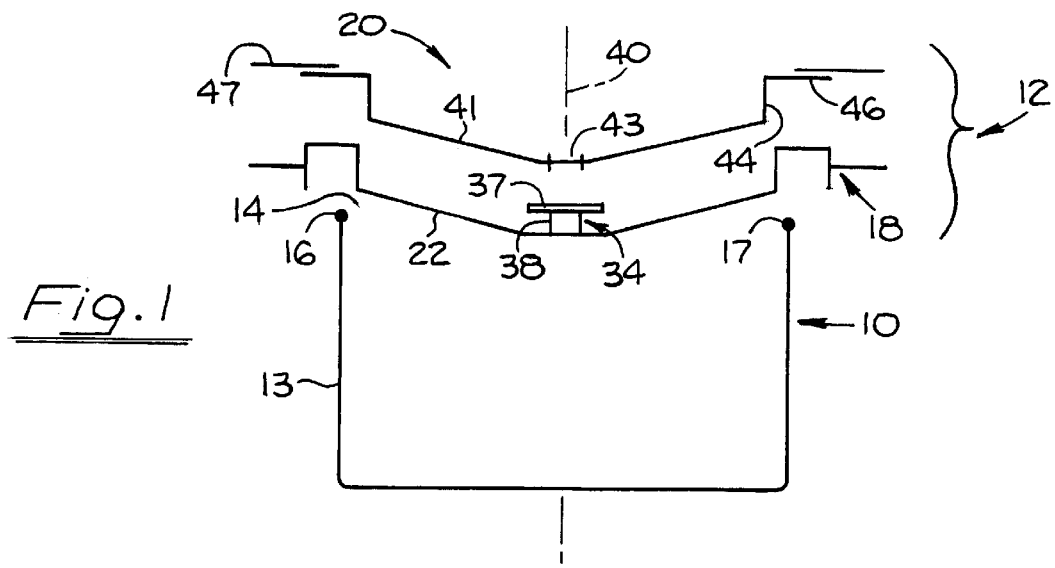
FIG. 1 is a diagrammatic view of a kettle with the compound cover of the invention shown in association therewith, in which the parts of the cover are spaced apart, and spaced from the kettle.
Figure 2:
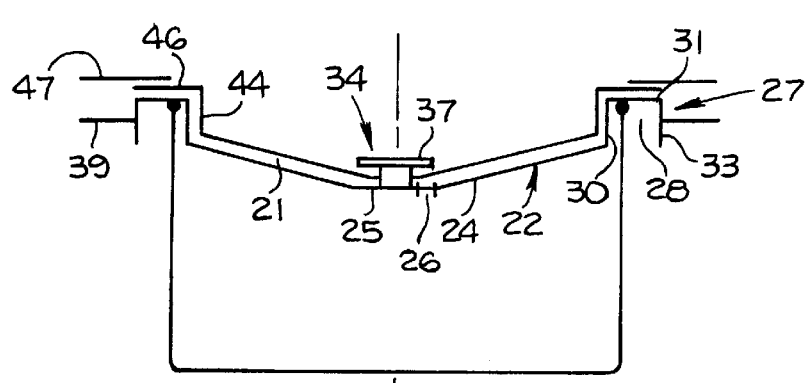
FIG. 2 is a view similar to FIG. 1 but showing the counterparts of the cover fitted together, and in place on the kettle.

As shown in FIG. 1, the cover 12 is made up of two parts, a lower part 18 and an upper part 20. These two parts, are of generally similar shape so they may be fitted together as shown in FIG. 2. However theta include certain minor differences as referred to hereinbelow.

The lower part 18 fits directly to the kettle, resting on the top edge of the kettle. The upper part fits on and rests on the lower part. The various elements are shown in diagrammatic form, and as such, a space 21 appears between the two parts. This space is of small dimensions, but is shown exaggerated in the drawing to facilitate understanding thereof.

The lower part 18 includes a central main portion, or body, 22 generally in the shape of a relatively flat cone with the concave side directed upwardly, as indicated at 24. At the center of the body is a relatively flat central portion 25 having one or more holes 26 therein.

The body 22 terminates radially outwardly in a peripheral or circumferential formation 27 forming a downwardly opening channel 28 with an inner vertical element 30 forming a shoulder, a top horizontal element 31, and an outer downwardly extending element 33. When the bottom part is fitted on the kettle, the upper edge 16 of the kettle is received in the channel 28, and the shoulder 30 may engage the wall 13 and retain the cover part on the kettle. In this sense, the elements 31, 33 are not mechanically necessary for holding the cove part on the kettle, but it is preferred that they be incorporated in the cover part for appearance sake, and provision of a safety factor.

Secured to the bottom element 25 is a Lock pin 34, having a top horizontal locking element 37 on a central stem 38. Secured to the outer element 33, at diametrically opposite positions are handles 39 for use by the user for rotating the bottom part on a central vertical axis 40.

Referring to the top part 20 of the cover, this part has a central body 41 substantially identical with the body 22 of the lower part except that it does not have a locking key (such as 34), but an elongated slot 43 for receiving the locking key 34 on the lower part. The body 41 is a flat conical shape with the convex side directed upwardly, and terminates in an upturned element 44, the latter having an outturned circumferential element 46. The upper body part 20 fits into the lower body part as shown in FIG. 2, and after insertion of the locking key 37 through the slot 43, the upper body part is rotated for example a quarter turn to lock the two parts together, both parts being rotatable around the central axis 40.

The upper body part is provided with radially outwardly extending handles 47 for ease in rotating the two body parts relative to each other.

When the two body parts are fitted together, the vertical element 44 engages the vertical surrounding element 30 of the lower body part and is completely confined in the central cavity in the lower body part. As in the case of the lower body part, the surrounding flat element 46 is not essential for construction, or for rotating operation, but provides an improved appearance and a possible safety factor.

Figure 3:
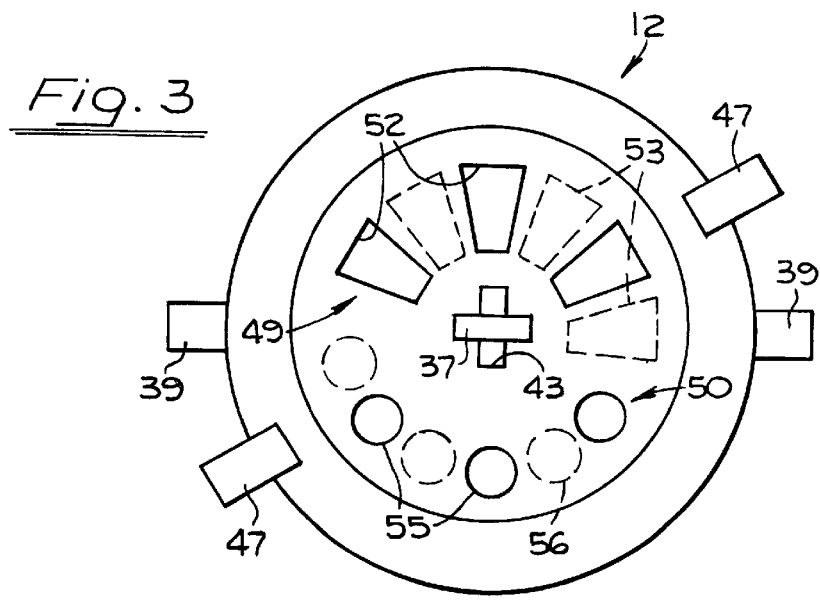
FIG. 3 is a top view taken from the top of FIG. 2.

For directly controlling the steam that is developed in the kettle, the two cover parts are provided with holes for enabling the steam to escape. Attention is directed first to FIG. 3. This figure shows two sets of holes, in the respective cover parts. The two sets of holes are indicated at 49, 50. The holes 49 include a set 52 in the top cover part, and a corresponding set 53 in the lower cover part. Similarly the holes 50 include a set 55 in the top cover part and a set 56 in the lower cover part. Both groups of holes 49, 50, are located in an arc, concentric with the central axis 40. In the group 49 the holes are wedge shape and in the group 50 the holes are circular.

As shown in FIG. 3, the cover parts are rotated to a relative position in which the holes in each of the groups 49, 50 are offset, and each hole is covered completely by a solid part in the other cover part, and the holes are all fully closed. This situation is similar to ordinary kettles and cover, where a very small amount of steam escapes even though the kettle and cover are dimensioned for relatively tight fitting.

FIG. 4 shows the cover parts partially offset relative to each other, producing holes of an intermediate size. In this case the escaping steam is between minimum and maximum.

When the holes are fully in register, they are of largest size, and the amount of steam generated is at a maximum rate.

Accordingly the cover parts may be positioned for the result referred to, namely a maximum amount of escape of steam as shown in FIG. 3, a minimum when the holes are completely covered, and a intermediate amount as shown when the holes are partially offset as represented in FIG. 4.

It will be understood that in fitting the cover parts together in the beginning, they are rotated to put them in a position with the locking pin 37 and slot 43 in longitudinal alignment. When the cover parts are moved completely together, the locking pin penetrates through the slot 43 and then upon relative rotation of the cover parts, the locking pin and slot are rotated to an offset position as represented in FIG. 3 locking the parts together. However there is a small amount of play between the cover parts, for convenience, that is, the cover parts are not so completely bound together as to make it difficult for them to be rotated relative to each other.

Although the bodies of the cover parts, 22, 41, are preferably conical, as indicated above, to Enable water that is condensed between the cover parts, or on the top cover part, to drain back into the kettle, they may be flat, or even conical with the convex side directed upwardly, within the broad scope of the invention. FIGS. 7 and 8 show modified forms including the latter features, with the elements bearing the same reference numerals with prime and double prime indications respectively. The features shown in these figures may be substituted in any of the other forms shown.

It is also desired to provide return drain holes 57, 58, as shown in FIG. 9. These holes are used particularly in the case where the central parts of the cover are flat or extending downwardly. In such cases, a layer of water 59 may collect between the cover parts by capillary action and in at least certain cases resists removal. The holes 57, 58 are located neat the edges of the bottom elements, and approximately 180° apart, when all of the other holes are out of register, and thereby tend to overcome the capillary action and the tendency to hold the cover parts together.

In the foregoing disclosure, it is presumed that a kettle of a predetermined size is utilized. However the invention is of such scope as to include a single set of covers, or compound cover, that will fit kettles of different sizes. FIG. 5 shows a kettle 60 of any desired predetermined size, this kettle having an open top 62.

The modified form of the compound cover is identified 63, having a lower part 65 and an upper part 66, both of circular shape.

Instead of the constructions in FIGS. 1 and 2, utilizing the channel shapes 18, 27, shapes 68, 70 are utilized. These shapes each includes a series of radial steps 71, in surrounding position. The kettle 60 may be considered a small kettle; and the lower part of the kettle rests thereon, with the inner one of the steps 71 directly engaging the kettle. The larger steps that are outward therefrom are utilized on successively larger sizes of kettle. Handles 74, similar to the handles 38, 47, are provided on the cover parts. Thus a single cover, made according to the construction of FIG. 5 may be utilized for any of a plurality of different size kettles.

I claim:
1. A combination cover for a kettle, comprising,
   a pair of individual parts both of substantially the same peripheral size as the kettle,
   each part including a central body and a peripheral portion forming a rim,
   the parts being capable of being fitted on the kettle in stacked form,
   both parts having a plurality of holes through the bodies thereof, and those in the parts being arranged in a common pattern, and
   the parts being rotatable relative to each other between a first position in which the holes in the two parts are in register, and a second position in which the holes in both the parts are completely out of register and completely blocked by solid portions of the opposite part.
2. A combination cover according to claim 1 wherein,
   the cover parts have central bodies extending down into the open top of the kettle.
3. A combination cover according to claim 1 wherein,
   the cover parts include a lower part and an upper part,
   the lower part includes a circumferential inverted channel adapted to receive the upper edge of the kettle.
4. A combination cover according to claim 3 wherein,
   the cover parts when on the kettle rotatable relative to each other and relative to the kettle, and
   each cover part includes a handle means extending radially outwardly beyond the periphery of the kettle.
5. A combination cover according to claim 1 wherein,
   each cover part has a central body in the shape of an inverted cone.
6. A combination cover according to claim 1 wherein,
   the cover parts have locking elements respectively, operable for releasably locking the body parts together against separation but enabling relative rotations therebetween.
7. A combination cover according to claim 6 wherein,
   the locking element on the lower cover part includes a lower axial stem and an elongated upper transverse bar, and
   the locking element on the upper body part, includes an elongated hole shaped for receiving the transverse bar.
8. A combination cover according to claim 4 wherein,
   the channel includes an outer axially downwardly extending flange, and
   the handle means on the lower cover part is secured to said axial flange.
9. A combination cover according to claim 4 wherein,
   the upper cover part has a peripheral transverse flange extending over and engaging the channel, and
   the handle means on the upper cover part is secured on the transverse flange.
10. A combination cover according to claim 9 wherein,
    the handle means on the upper part extends radially outwardly beyond the transverse flange.

11. A combination cover according to claim 4 wherein, each cover part has a plurality of surrounding peripheral elements mutually arranged to form steps in radial directions, and forming under surfaces in a corresponding pattern, respectively engagable with the top rim of each of a plurality of kettles of different sizes.

12. A combination cover according to claim 11 wherein, each cover part has a return drain hole in its central part, and the holes are substantially 180° apart where the cover parts are disposed in a predetermined position with the remaining holes are out of register.

* * * * *